United States Patent [19]

Johnson, Jr. et al.

[11] 4,420,806

[45] Dec. 13, 1983

[54] INTERRUPT COUPLING AND MONITORING SYSTEM

[75] Inventors: Mize Johnson, Jr., West Melbourne; Harold J. Miller, Brevard County, both of Fla.

[73] Assignee: Harris Corporation, Melbourne, Fla.

[21] Appl. No.: 225,270

[22] Filed: Jan. 15, 1981

[51] Int. Cl.³ .............................................. G06F 11/30
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,286,239 | 11/1966 | Thompson et al. | 364/200 |
| 3,496,551 | 2/1970 | Driscoll et al. | 364/200 |
| 3,676,861 | 7/1972 | Ruth | 364/200 |
| 3,753,234 | 8/1973 | Gilbert et al. | 364/200 |
| 4,080,649 | 3/1978 | Calle et al. | 364/200 |
| 4,153,934 | 5/1979 | Sato | 364/200 |

*Primary Examiner*—Thomas M. Heckler
*Attorney, Agent, or Firm*—Antonelli, Terry & Wands

[57] ABSTRACT

An interrupt coupling scheme for a multiprocessor data processing network capable of providing the current status of all interrupts to all processors in the network employs an associated interrupt latch for each processor, to which the lines of the system data bus are bidirectionally coupled, and an address decoder that is coupled to the system address bus. When a processor wishes to interrupt another processor it drives the data bus so as to set the corresponding latch bit in the addressed processor's interrupt status latch, thereby presenting to the addressed processor an interrupt request signal.

The contents of the interrupt request latch are selectively masked by the destination processor and then encoded into an interrupt vector to which the destination processor responds during its task assignment operations. When considered as a group, the interrupt status latches associated with the respective processors of the network effectively form an interrupt status table or matrix that is selectively addressable by any processor. The rows of the matrix correspond to the respective addresses of the processors for whom the interrupts are destined and the columns of the matrix correspond to the processors from which the interrupt requests originated.

18 Claims, 3 Drawing Figures

INTERRUPT COUPLING AND MONITORING SYSTEM

FIELD OF THE INVENTION

The present invention relates in general to data processing systems and, more particularly, to an interrupt coupling and monitoring arrangement associated with a multiprocessing system.

BACKGROUND OF THE INVENTION

The advance and development of the data processing industry has seen efforts toward increasing the speed and reducing the size of the component parts of data processing systems together with an integration of the processor systems themselves, thereby realizing sophisticated multiprocessor networks. As the processors within the network interact with one another in performing the respective tasks for which they have been programmed, interprocessor interrupts are employed when a processor requires the services of another processor. For this purpose, it has been a common practice to assign respective interrupt lines for each of the processors of the system and to interconnect these lines individually to every respective processor, usually in accordance with some form of priority scheme for handling the interrupts. Unfortunately, as the number of processors per network increases, the corresponding number of interrupt lines required makes this approach impractical if not almost impossible to implement.

In an effort to circumvent the wiring problem associated with the above approach, there has been proposed a scheme whereby the interrupt lines are encoded and a processor for whom an interrupt is intended is selectively addressed. At the destination processor, the interrupts are sequentially stored in a first-in, first-out register (FIFO), and the destination processor handles the interrupts on a first-come, first-served basis. Now, although this scheme offers a reduction in the number of interrupt lines, it also has its own drawbacks. For one thing, additional hardward is required for the destination processor to acknowledge the handling of an incoming interrupt. Also, the interrupts cannot be prioritized, since the destination processor handles each request in the order in which it is received.

A major shortcoming of each of the above schemes is their inability to provide a status of all interrupts to every processor on a continual basis. In modern sophisticated multiprocessor environments, this requirement is extremely important, as it not only permits tasks to be handled on a priority basis, but enables the time efficiency of system operation to be maximized.

An additional shortcoming of employing the above schemes in a multiprocessor environment is the requirement that a processor which uses interrupts to communicate with another processor must use a different mechanism if it is to interrupt itself; this lack of uniformity introduces additional complexity into the software.

SUMMARY OF THE INVENTION

In accordance with the present invention, there is provided a new and improved interrupt coupling scheme for a multiprocessor data processing network that is capable of providing the current status of all interrupts to all the processors in the network and which also provides a uniform method of originating interrupts that is independent of the destination processor. For this purpose, the system in accordance with the present invention employs an interrupt latch for each processor, to which the lines of the system data bus are bidirectionally coupled, and an address decoder that is coupled to the system address bus. When a processor wishes to interrupt another processor (assuming it has gained control of the communication bus) it couples the address of the processor to whom the interrupt is to be vectored and reads the addressed processor's interrupt status latch. If, after reading the interrupt status latch, the requesting processor still wishes to place an interrupt, the requesting processor drives the system data bus so as to set the corresponding latch in the addressed processor's interrupt status latch, thereby presenting to the addressed processor an interrupt request signal.

The contents of the interrupt request latch are selectively masked and prioritized as necessary by the destination processor and then encoded into an interrupt vector to which the destination processor responds during its task assignment operations. When considered as a group, the interrupt status latches associated with the respective processors of the network effectively form an interrupt status table or matrix that is selectively addressable by any processor. The rows of the matrix correspond to the respective addresses of the processors for whom the interrupts are destined and the columns of the matrix correspond to the processors from which the interrupt requests originated. Since each processor may selectively examine the contents of the table or matrix for interrupt activity, a more efficient use of the various processing functions of the network is afforded; yet no special signal lines are required to implement this capability.

DETAILED DESCRIPTION

In the detailed description to follow of the configuration and operation of the interrupt coupling and monitoring system in accordance with the present invention, it should be understood that the multiprocessor network with which the present invention may be associated is not limited to any particular type; nor is a description of the details of such a network necessary for an appreciation of the present invention. For purposes of facilitating the description to follow, the network will be presumed to be distributed along the system bus. Typically, the bus contains address, data, and control portions to which the various processor units that are distributed along the bus are coupled. While the manner of gaining access to and control of the bus will not be described here, since it is not necessary for an understanding of the present invention, attention may be directed to the description of a suitable arrangement with which the present invention may be associated in copending application by Mize Johnson, Jr. entitled SYNCHRONOUS BUS ARBITER, U.S. Ser. No. 224,070, filed Jan. 12, 1981, and assigned to the assignee of the present application. In the description to follow, only those portions of the bus and associated control logic that are germane to the operation of the present invention will be detailed.

Figure 1:
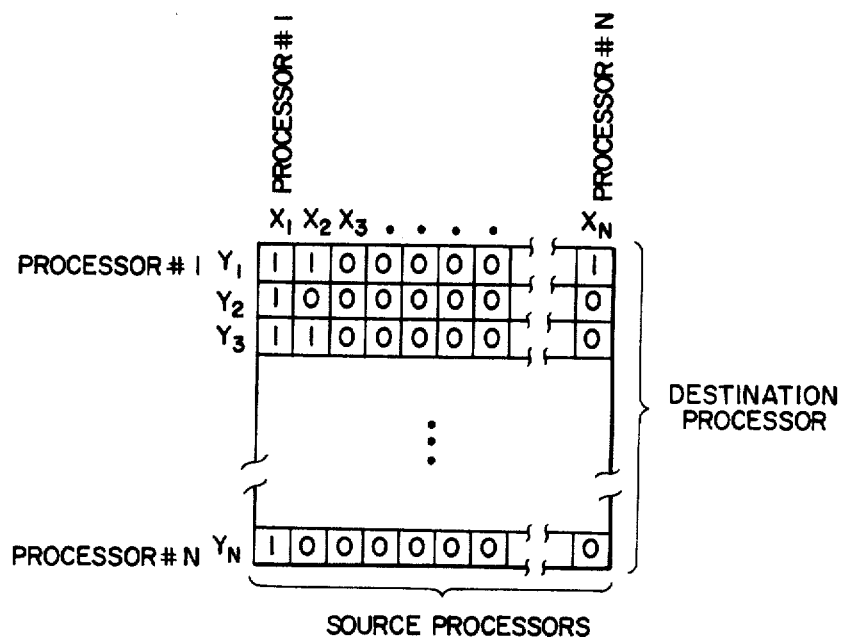
FIG. 1 illustrates an interrupt status matrix in accordance with which the basic principles of the present invention are implemented.

The basic principle in accordance with which the present invention operates may be understood by considering the matrix arrangement of interrupt signals shown in FIG. 1. A "1" indicates an interrupt is present, while a "0" bit corresponds to no interrupt present. The matrix is a symmetrical matrix of N rows and N columns of interrupt status bits. Each row $Y_i$ corresponds to the address of one of the processors of the multiprocessor network for whom interrupts may be destined. Each column $X_i$ corresponds to the address of one of the processors of the network from whom an interrupt has originated. Thus, the location of each bit of the matrix identifies both the source and the destination of the interrupt. It should be noted here that the matrix need not be symmetrical. For example, where multiple interrupt capability is provided for one or more processors, the number of columns (corresponding to the increased number of interrupting data bus lines) may be greater than the number of rows of the matrix. For purposes of facilitating the present description, however, it will be assumed that the matrix is symmetrical.

In addition, although the matrix of the present example employs a single bit to represent each element in the matrix, it should be understood that larger representations or other types of data (e.g. bytes) may be associated with each respective element in the matrix. Moreover, the interrupt scheme may employ plural matrices, configured in accordance with the principles set forth herein, to satisfy various system design requirements. It should also be noted that the lines need not be assigned in accordance with a priority order; however, the design of a multiprocessor system usually includes a prioritization of the various processors of the system and such prioritization may be assumed to be included in the present example.

Considering now selected portions of the matrix, row $Y_1$ corresponds to the address of one of the N processors of the multiprocessor network, e.g. processor #1. For a sequential priority hierarchy, processor #1 will be assumed to have highest priority, while processor #N will be assumed to have lowest priority. Thus, under normal circumstances, but depending upon specific program instructions, if processor $Y_A$ has received interrupt requests from both processor $Y_B$ and processor $Y_C$, where A, B, and C are positive integers and less than or equal to N and B is less than C, the interrupt from processor $Y_B$ would be serviced first. In the illustration shown in FIG. 1, row #1 contains interrupt requests (i.e. "1" bits) in columns 1, 2, and N, indicating that processor #1 has received an interrupt request from itself, processor #2, and processor #N; each of rows #3, and #N has an interrupt request bit "1" in column 1, indicating the processor #1 has directed an interrupt to processors number #3 and #N.

Figure 2:
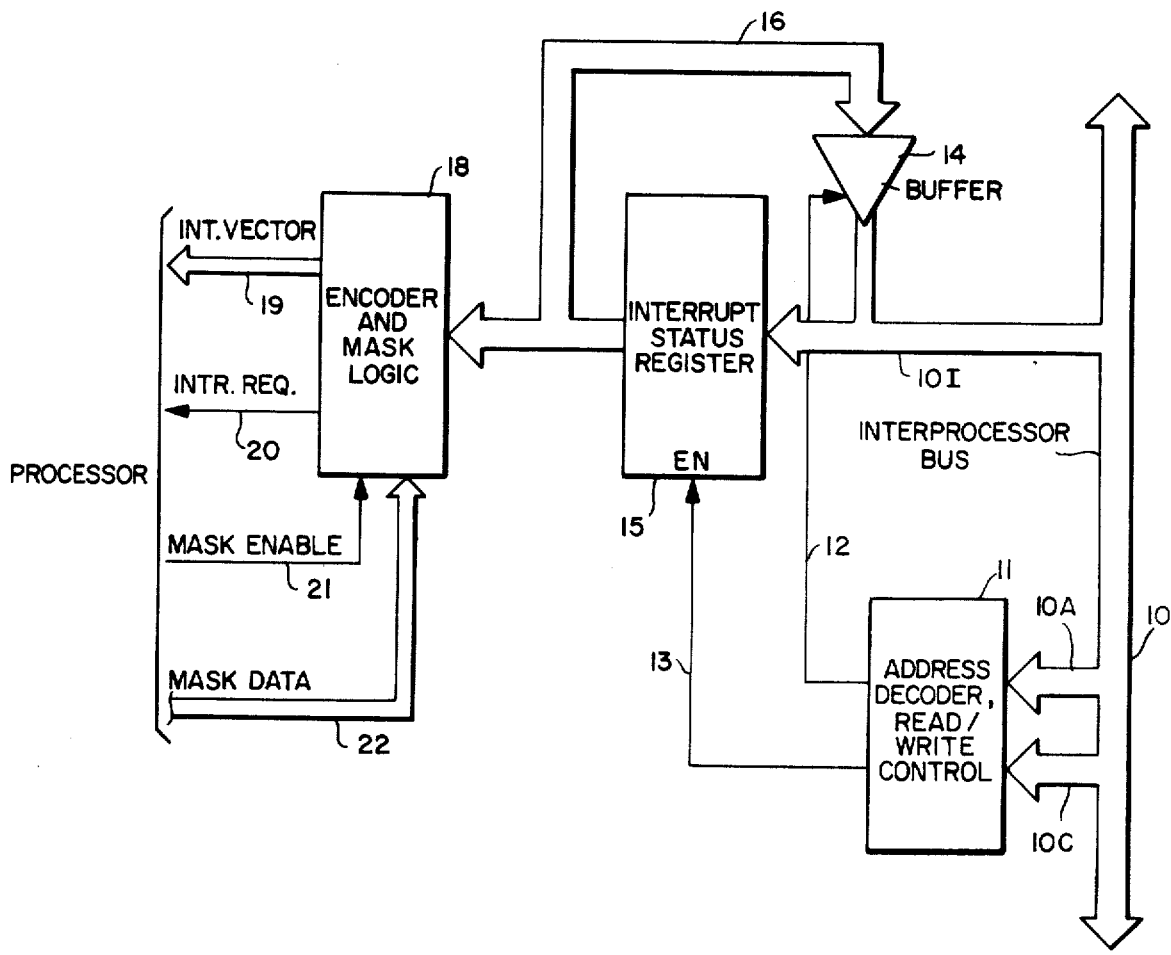
FIG. 2 is a logic block diagram of interrupt monitoring and processing circuitry in accordance with the present invention.

Referring now to FIG. 2, there is illustrated a logic block diagram of an individual interrupt monitoring and processing circuit corresponding to one of the rows of the matrix shown in FIG. 1 which is associated with each respective processor. Preferably, the physical configuration of each processor card contains its own associated circuit shown in FIG. 2, although the physical location of the circuits may be tailored to meet system packaging and hardware needs as desired. Thus, for an N processor network there will be N such circuits as shown in FIG. 2 (and in more detail in FIG. 3 to be described below).

Data communications among the various processors of the network are effected by way of a distributed-connected communication bus 10, as described briefly above. In interfacing with the interrupt monitor and processing logic circuit shown in FIG. 2, bus 10 is coupled to an interrupt status register 15 and an address decoder, read/write control circuit 11. Bus 10 contains a data portion 10I that is coupled to the N parallel stages of interrupt status register 15 and outputs from buffer unit 14. The inputs of buffer unit 14 are coupled over an N bit data link 16 from the outputs of the N stages of interrupt status register 15. Bus 10 also contains a set of address lines 10A and read/write control lines 10C that are coupled to address decoder, read/write circuit 11. Address decoder, read/write control circuit 11 compares the contents of address line 10A with the address of its associated processor. When the two address codes match, it enables one of the interrupt status register 15 or buffer unit 14, depending upon the state of read/write control line 10C, thereby either writing the contents of bus 10I into interrupt status register 15 or reading out the contents of interrupt status register 15, via buffer 14, onto bus 10I.

For the purpose of generating an interrupt vector to its associated processor, the interrupt monitor and processing logic circuit contains and encoder and mask logic circuit 18 that is coupled to the output of interrupt status register 15, via link 16. The encoder portion of circuit 18 may be comprised of combinational logic to generate a selected interrupt vector, depending upon a particular encoding scheme, such as preassigned priority, for the contents of the interrupt status latch and any mask supplied over mask link 22 from the processor. Via line 21, the processor enables the mask logic, while line 20 supplies an interrupt request signal to the processor, as link 19 supplies the encoded interrupt vector.

In order to facilitate an understanding of the operation of the present invention, the basic logic block diagram configuration shown in FIG. 2 will be explained in more detail with reference to FIG. 3.

Figure 3:
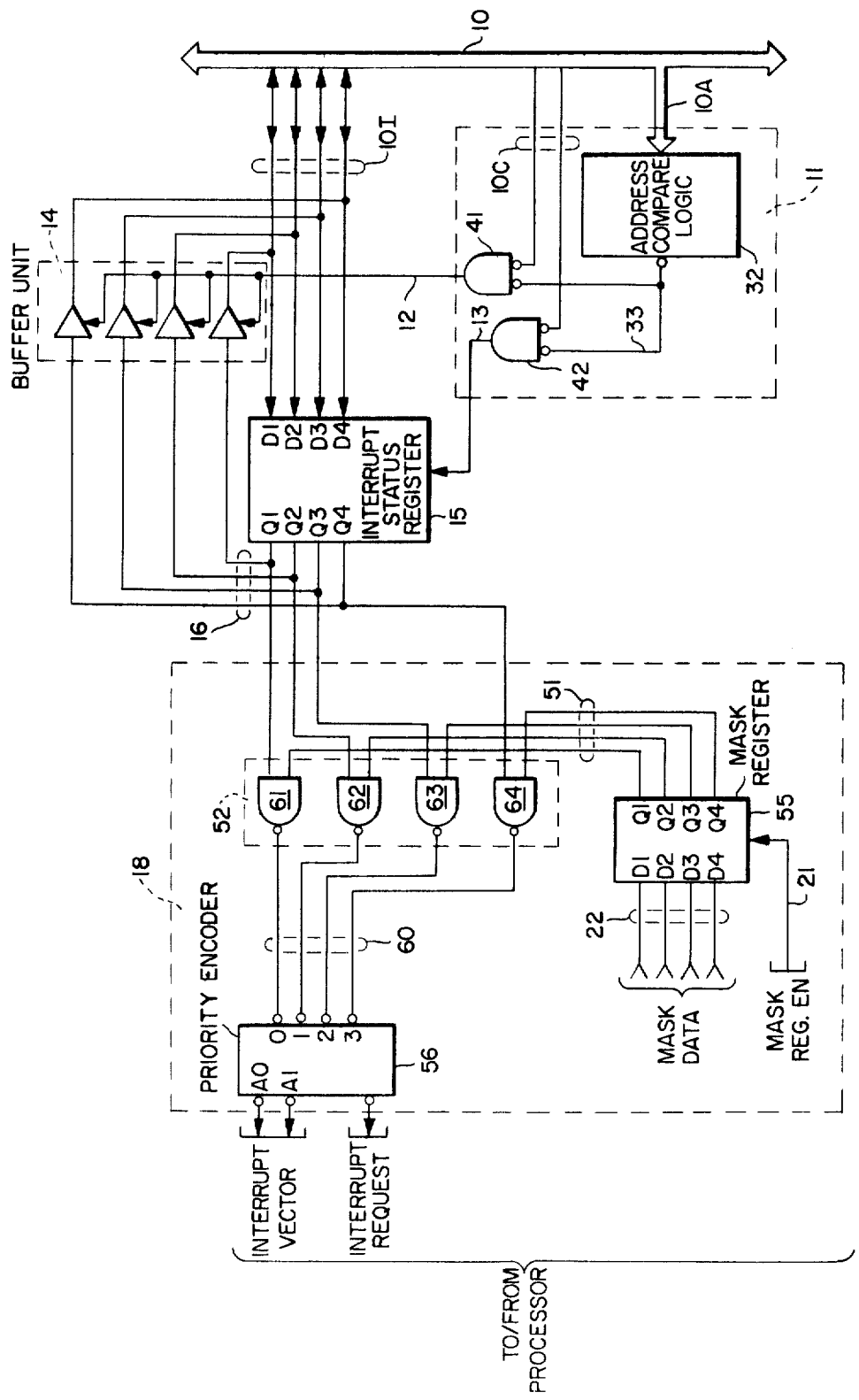
FIG. 3 is a detailed logic diagram of the components of the interrupt monitoring and processing circuitry shown in FIG. 2.

Referring now to FIG. 3, the address portion 10A of the system bus is coupled to an address comparator 32 within address decoder and read/write control circuit 11. Address comparator 32 may comprise combinational logic that decodes the contents of link 10A and produces an output on line 33 when the address contents of link 10A corresponds to the address of the processor associated with this particular comparator. Link 10C is comprised of respective read and write lines, the read line portion of the control link 10C being coupled as one input of NOR gate 41 and the write line being coupled as one input of NOR gate 42. The other input of each of NOR gates 41 and 42 is coupled to line 33 at the output of the address comparator 32. The output of NOR gate 41 is coupled over line 12 to buffer unit 14 which is comprised of a plurality of buffers, one for each interrupt bit, the outputs of which are coupled to respective data lines of link 10I. For purposes of the present description, in order to facilitate the illustration in FIG. 3, it will be presumed that the number N of interrupt lines is equal to four. In reality, however, a much larger number of lines is employed, as the number of processors is normally much greater than four and multiple interrupt lines per processor may be used. The number four is chosen here to simplify the drawing.

The output of NOR gate 42 is coupled over line 13 as a write-enable input to interrupt status register 15. An enable input from the output of NOR gate 42 causes the contents of data bus 101 to be loaded into interrupt status register 15. The four outputs of stages Q1-Q4 of register 15 are coupled over link 16 to the respective buffers of buffer unit 14 and to one input of each of NAND gates 61-64 within mask logic circuit 52. Each of NAND gates 61-64 receives a second input by way of a respective one of the lines of link 51 that are coupled to the stages of a mask register 55. Mask register 55 is coupled to receive selected mask bits by way of link 22 from the processor. It also receives a mask register enable signal via line 21 from the processor. The output of mask logic circuit 52 is coupled via link 60 to respective inputs of an encoder circuit 56. Encoder circuit 56 may comprise a priority encoder which simply converts the code on link 60 into an interrupt vector over link 19 to be coupled to the processor. For a priority encoding scheme, using the four-bit interrupt link shown in FIG. 3, encoder 56 will produce, on interrupt vector link 19, a code representative of that interrupt level as indicated by the output of one of NAND gates 61-64 which has the highest priority. Encoder 56 need not be limited to a priority encoding logic circuit, but other forms of encoding may be employed depending upon system operational requirements. For example, encoder 56 could additionally be provided with combinational logic circuitry which generates an additional and overriding interrupt vector when more than a single processor is generating an interrupt; namely, when more than one of NAND gates 61-63 is providing an output over link 60. Encoder 56 could also monitor a selected plurality of the interrupt status bits which would be granted priority over a normal numerical hierarchy scheme.

Considering now the operation of the interrupt monitoring and processing circuitry of the present invention, assuming that a processor which requires access to another processor has control of the bus, it transmits the address of the processor for whom the interrupt communication is intended over the address portion of the communication bus and couples a read signal over the control portion of the bus. Address compare logic circuit 32 in the processor to whom the communication is directed will decode the address code and supply an enable signal over line 13 to each of NOR gates 41 and 42. The read signal on control portion 10C will cause the contents of interrupt status register 15 to be coupled through buffer unit 14 and onto the data bus 101 to be read by the requesting processor. When the requesting processor observes that the state of its interrupt bit (namely, that bit of the destination interrupt status register 15 associated with its particular interrupt line) does not indicate that an interrupt has been supplied to the destination processor, it carries out an interrupt write communication in which the destination processor receives a write signal, the read enable signal being terminated, so that NOR gate 41 disables buffer unit 14 while NOR gate 42 enables register 15. This causes the state of the particular data bus line associated with the source processor and which is presently being driven by the source processor to be loaded into interrupt status register 15, so that, considered as a whole, the contents of interrupt status register 15 have changed state. The newly written-in contents of register 15 are logically combined with any masking code stored in mask register 15 via masking logic circuit 52 and applied over link 60 to encoder 56. Encoder 56 then generates an interrupt vector to the destination processor, so that it may respond to any interrupt placed in register 15. If the interrupt being applied to register 15 from the source processor under consideration is the only interrupt, the vector generated over link 19 would correspond to this interrupt.

After the destination processor has serviced the interrupt, it may then clear that interrupt from register 15 by conducting a read operation for the interrupted bit of interest and then rewriting that bit back into register 15 as a "0". Alternatively, once the source processor has been serviced, it may in turn rewrite the contents of the register 15 in the destination processor which supplied the service for the interrupt of interest.

As an adjunct to the interrupt monitor and processing configuration of the present invention as shown in FIG. 3, the contents of register 15 may be employed to reference additional memory, such as one containing multiple levels of interrupt from the source processor. The destination processor would then reference the additional memory and handle the multiple levels of interrupt from that source processor in accordance with a prescribed format. This adjunct feature of the invention emphasizes the simplified approach that the matrix principle described above with reference to FIG. 1 enjoys. The amount of hardware required for monitoring all interrupts in the system is significantly reduced, with the same circuitry by way of which each processor responds to an interrupt being capable of being read out by every other processor in the system, so that the status of any interrupt for any processor is readable by every other processor.

While we have shown and described one embodiment in accordance with the present invention, it is understood that the same is not limited thereto but is susceptible of numerous changes and modifications as are known to a person skilled in the art, and we therefore do not wish to be limited to the details shown and described herein but intend to cover all such changes and modifications as are obvious to one of ordinary skill in the art.

What is claimed:

1. For use in a data processing system wherein a plurality of devices are intercoupled by way of an interrupt signal conveying transmission link to provide interrupt signals to each other, each device having an apparatus associated therewith for intercoupling said interrupt signals among said devices, said apparatus comprising:
    first means for storing interrupt signals conveyed thereto over said transmission link from said plurality of devices, and
    second means responsive to an address signal from a device representative of said associated device for causing an interrupt signal stored by said first means to be coupled to said transmission link.

2. An apparatus according to claim 1, wherein said second means comprises means for causing each interrupt signal stored by said first means to be coupled onto said transmission link.

3. An apparatus according to claim 1, wherein said second means includes means for causing an interrupt signal conveyed by said transmission link to be stored by said first means.

4. An apparatus according to claim 1, further including third means, coupled to said first means, for selectively generating an interrupt vector to be coupled to said associated device in accordance with the interrupt signals stored by said first means.

5. An apparatus according to claim 4, wherein said third means includes means, coupled to said associated device and said first means, for selectively generating an interrupt vector to be coupled to said associated device in accordance with selected ones of the interrupt signals stored by said first means.

6. An apparatus according to claim 2, further including third means, coupled to said first means, for selectively generating an interrupt vector to be coupled to said associated device in accordance with the interrupt signals stored by said first means.

7. An apparatus according to claim 6, wherein said third means includes means, coupled to said associated device and said first means, for selectively generating an interrupt vector to be coupled to said associated device in accordance with selected ones of the interrupt signals stored by said first means.

8. An apparatus according to claim 2, wherein said transmission link comprises a system data bus and said second means includes means for causing an interrupt signal conveyed by said data bus to be stored by said first means.

9. An apparatus according to claim 8, further including third means, coupled to said first means, for selectively generating an interrupt vector to be coupled to said associated device in accordance with the interrupt signals stored by said first means.

10. An apparatus according to claim 9, wherein said third means includes means, coupled to said associated device and said first means, for selectively generating an interrupt vector to be coupled to said associated device in accordance with selected ones of the interrupt signals stored by said first means.

11. For use in a multiprocessor data processing system wherein a plurality of processors are intercoupled by way of an interrupt signal conveying transmission link to provide interrupt signals representative of requests for service from one another, each processor having an apparatus associated therewith for intercoupling said interrupt signals among said processors, said apparatus comprising:

first means for storing interrupt signals conveyed thereto over said transmission link from said plurality of processors; and second means responsive to an address signal from a processor representative of said associated processor, for causing each interrupt signal stored by said first means to be coupled to said transmission link.

12. An apparatus according to claim 11, wherein said second means includes means for causing an interrupt signal from the processor from which said address signal is provided to be stored by said first means.

13. An apparatus according to claim 12, further including third means, coupled to said first means, for selectively generating an interrupt vector to be coupled to said associated processor in accordance with interrupt signals stored by said first means.

14. An apparatus according to claim 13, wherein said third means includes means, coupled to said associated processor and said first means, for selectively generating an interrupt vector to be coupled to said associated processor in accordance with selected ones of the interrupt signals stored by said first means.

15. An apparatus according to claim 11, wherein said transmission link comprises a system data bus.

16. An apparatus according to claim 15, wherein said second means includes means for causing an interrupt signal from the processor from which said address signal is provided to be stored by said first means.

17. For use in a multiprocessor data processing system wherein a plurality of processors are intercoupled to provide interrupt signals representative of requests for service from one another, a method of intercoupling said interrupt signals among said processors comprising the steps of:

generating a matrix of interrupt signals, the respective rows of which are associated with the respective processors of said system for which interrupt signals are destined and the respective columns of which are associated with the respective processors of said system from which interrupt signals have originated; and enabling each processor to have access to said matrix.

18. A method according to claim 17, wherein the rows and columns of said matrix are arranged in accordance with a prescribed hierarchy priority among said processors.

* * * * *